(12) United States Patent
Wang et al.

(10) Patent No.: US 12,541,316 B2
(45) Date of Patent: Feb. 3, 2026

(54) DYNAMIC BLOCK WRITE CACHE PASS-THROUGH MODE

(71) Applicant: Microsoft Technology Licensing, LLC, Redmond, WA (US)

(72) Inventors: Junxiang Wang, Shanghai (CN); Xigeng Sun, Shanghai (CN); Vadim Makhervaks, Bellevue, WA (US); Sijia Huang, Shanghai (CN); Yingrui Tong, Shanghai (CN); Yuxing Zhou, Shanghai (CN); Zhihao Liu, Shanghai (CN); Bangzhu Zhu, Kunming (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/595,061

(22) Filed: Mar. 4, 2024

(65) Prior Publication Data

US 2025/0156333 A1    May 15, 2025

Related U.S. Application Data

(60) Provisional application No. 63/598,426, filed on Nov. 13, 2023.

(51) Int. Cl.
G06F 12/00       (2006.01)
G06F 3/06        (2006.01)
G06F 9/455       (2018.01)
G06F 12/0802     (2016.01)
G06F 12/0888     (2016.01)

(52) U.S. Cl.
CPC ............ *G06F 3/065* (2013.01); *G06F 3/0604* (2013.01); *G06F 3/0656* (2013.01); *G06F 3/0683* (2013.01); *G06F 9/45558* (2013.01); *G06F 12/0802* (2013.01); *G06F 12/0888* (2013.01); *G06F 2009/45579* (2013.01); *G06F 2009/45583* (2013.01)

(58) Field of Classification Search
CPC .. G06F 12/0866; G06F 12/0888; G06F 12/16; G06F 9/45533
See application file for complete search history.

(56) References Cited

U.S. PATENT DOCUMENTS 10,831,684 B1  11/2020  Kamran
11,086,524 B1   8/2021  Sun
11,886,427 B1   1/2024  Shveidel
(Continued)

OTHER PUBLICATIONS

U.S. Appl. No. 63/598,420, filed Nov. 13, 2023.
(Continued)

*Primary Examiner* — Shawn X Gu
(74) *Attorney, Agent, or Firm* — Workman Nydegger

(57) ABSTRACT

Methods and systems for transitioning write input/output (I/O) requests from a write-caching mode to a pass-through mode. The method includes determining when a condition has been met for transitioning the write I/O requests and de-staging one or more logs from a write cache to a backing store, where each log corresponds to a pending write I/O operation by a consumer. The method further includes determining when no log remains in the write cache for de-staging to the backing store and initiating the pass-through mode by routing new write I/O requests directly to the backing store instead of the write cache.

20 Claims, 8 Drawing Sheets

(56) References Cited

U.S. PATENT DOCUMENTS

| | | |
|---|---|---|
| 12,117,938 B1 | 10/2024 | Derzhavetz |
| 12,182,421 B1 | 12/2024 | Vankamamidi |
| 12,204,457 B1 | 1/2025 | Vankamamidi |
| 12,271,625 B1 | 4/2025 | Astolfi |
| 2009/0138625 A1 | 5/2009 | Lee et al. |
| 2012/0124294 A1* | 5/2012 | Atkisson ............ G06F 12/0804 711/135 |
| 2012/0278511 A1 | 11/2012 | Alatorre |
| 2016/0092118 A1 | 3/2016 | Kumar |
| 2016/0306580 A1 | 10/2016 | Pinto |
| 2017/0052723 A1 | 2/2017 | Douglas |
| 2017/0308298 A1 | 10/2017 | Vyshetsky |
| 2018/0150397 A1 | 5/2018 | Gupta |
| 2018/0316760 A1 | 11/2018 | Chernin |
| 2019/0317906 A1 | 10/2019 | Adavi |
| 2020/0034475 A1 | 1/2020 | Venkatesan |
| 2020/0097419 A1 | 3/2020 | Xing |
| 2020/0379925 A1 | 12/2020 | Andrus |
| 2020/0409583 A1 | 12/2020 | Kusters |
| 2021/0117333 A1 | 4/2021 | Qureshi |
| 2021/0216459 A1 | 7/2021 | Benhanokh |
| 2022/0019362 A1 | 1/2022 | Badiger |
| 2023/0013913 A1 | 1/2023 | Zinger |
| 2023/0195751 A1 | 6/2023 | Sun |
| 2023/0333777 A1 | 10/2023 | Shveidel |
| 2023/0342087 A1 | 10/2023 | He |
| 2024/0106754 A1 | 3/2024 | Meng |
| 2024/0232020 A1 | 7/2024 | Shveidel |
| 2024/0256190 A1 | 8/2024 | Shveidel |
| 2025/0103490 A1 | 3/2025 | Seibel |
| 2025/0156104 A1 | 5/2025 | Wang |
| 2025/0156322 A1 | 5/2025 | Tong |
| 2025/0156353 A1 | 5/2025 | Jin |
| 2025/0156360 A1 | 5/2025 | Jin |
| 2025/0159043 A1 | 5/2025 | Tong |

OTHER PUBLICATIONS

U.S. Appl. No. 63/598,426, filed Nov. 13, 2023.
U.S. Appl. No. 63/598,429, filed Nov. 13, 2023.
U.S. Appl. No. 63/598,438, filed Nov. 13, 2023.
U.S. Appl. No. 18/594,982, filed Mar. 4, 2024.
U.S. Appl. No. 18/587,247, filed Feb. 26, 2024.
U.S. Appl. No. 18/587,258, filed Feb. 26, 2024.
U.S. Appl. No. 18/592,046, filed Feb. 29, 2024.
U.S. Appl. No. 18/592,026, filed Feb. 29, 2024.
Gugnani, et al., "Arcadia: A Fast and Reliable Persistent Memory Replicated Log", arXiv:2206.12495v1, Jun. 24, 2022, pp. 1-14.
International Search Report and Written Opinion received for PCT Application No. PCT/US2024/051682, (MS#413653-PCT01) Feb. 11, 2025, 14 pages.
International Search Report and Written Opinion received for PCT Application No. PCT/US2024/052172 (MS#413654-PCT01), Jan. 29, 2025, 14 Pages.
Lee, et al., "X-SSD: A Storage System with Native Support for Database Logging and Replication", IEEE, Computer Society Press, Jun. 12, 2022, pp. 988-1002.
Ruan, et al., "Persistent Memory Disaggregation for Cloud-Native Relational Databases", International conference on Automotive User Interfaces and Interactive Vehicular Applications, Mar. 25, 2023, pp. 498-512.
Yang, et al., "Orion: A Distributed File System for Non-Volatile Main Memories and RDMA-Capable Networks", Feb. 26, 2019, pp. 221-234.
"Notification Port Example", Retrieved From: https://learn.microsoft.com/en-us/previous-versions/windows/desktop/mscs/notification-port-example, May 31, 2018, 4 Pages.
"Receiving Cluster Events", Retrieved From: https://learn.microsoft.com/en-us/previous-versions/windows/desktop/mscs/receiving-cluster-events, May 31, 2018, 1 Page.
Notice of Allowance mailed on Apr. 8, 2025, in U.S. Appl. No. 18/594,982, 09 pages.
Notice of Allowance mailed on Jun. 23, 2025, in U.S. Appl. No. 18/594,982, 10 pages.
Non-Final Office Action mailed on Jun. 30, 2025, in U.S. Appl. No. 18/592,026, 15 pages.
Non-Final Office Action mailed on Aug. 8, 2025, in U.S. Appl. No. 18/592,046, 16 pages.
Notice of Allowance mailed on Aug. 12, 2025, in U.S. Appl. No. 18/594,982, 10 pages.
Non-Final Office Action mailed on Aug. 27, 2025, in U.S. Appl. No. 18/587,247, 12 pages.
Notice of Allowance mailed on Sep. 16, 2025, in U.S. Appl. No. 18/594,982, 10 pages.
Notice of Allowance mailed on Sep. 30, 2025, in U.S. Appl. No. 18/592,026, 7 Pages.
Notice of Allowance mailed on Dec. 9, 2025, in U.S. Appl. No. 18/952,046 07 pages.

* cited by examiner

DYNAMIC BLOCK WRITE CACHE PASS-THROUGH MODE

CROSS-REFERENCE TO RELATED APPLICATIONS

This application claims priority to, and the benefit of, U.S. Provisional Application Ser. No. 63/598,426, filed Nov. 13, 2023, and entitled "SINGLE-PHASE COMMIT FOR REPLICATED CACHE DATA," the entire contents of which are incorporated by reference herein in their entirety.

BACKGROUND

Cloud computing has revolutionized the way data is stored and accessed, providing scalable, flexible, and cost-effective solutions for businesses and individuals alike. A core component of these systems is the concept of virtualization, which allows for the creation of virtual machines (VMs) or containers that can utilize resources abstracted from the physical hardware. VMs and containers utilize storage resources, typically in the form of virtual disks. Oftentimes, virtual disks are not tied to any specific physical storage device, but rather, they are abstracted representations of storage space that can be dynamically allocated and adjusted based on the requirements of each VM or container. This abstraction allows for greater flexibility and scalability, as storage resources can be allocated and adjusted dynamically based on the requirements of the VM or container.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including: determining that a condition has been met for transitioning write input/output (I/O) requests for a consumer from a write-caching mode to a pass-through mode; de-staging one or more logs for the consumer from a write cache to a backing store, each log corresponding to a pending write I/O operation by the consumer; determining that no log for the consumer remains in the write cache for de-staging to the backing store; and initiating the pass-through mode after determining that no log for the consumer remains in the write cache for de-staging to the backing store, including routing a new write I/O request to the backing store rather than routing the new write I/O request to the write cache.

In some aspects, the techniques described herein relate to methods, systems, and computer program products, including: determining that a condition has been met for transitioning write I/O requests for a consumer from a write-caching mode to a pass-through mode; de-staging one or more logs for the consumer from a write cache to a backing store, each log corresponding to a pending write I/O operation by the consumer; routing a first new write I/O request to the write cache after determining that the condition has been met; determining that no log for the consumer remains in the write cache for de-staging to the backing store; and initiating the pass-through mode after determining that no log for the consumer remains in the write cache for de-staging to the backing store, including routing a second new write I/O request to the backing store rather than routing the second new write I/O request to the write cache.

In some aspects, the techniques described herein relate to methods, systems, and computer program products, including: determining that a condition has been met for transitioning write I/O requests for a consumer from a write-caching mode to a pass-through mode; de-staging one or more logs for the consumer from a write cache to a backing store, each log corresponding to a pending write I/O operation by the consumer; routing a first new write I/O request to the write cache after determining that the condition has been met, including introducing latency into the first new write I/O request based on, a first rate of de-staging the one or more logs for the consumer from the write cache to the backing store, or a second rate of write I/O requests received after identifying the condition for transitioning write I/O requests for the consumer; determining that no log for the consumer remains in the write cache for de-staging to the backing store; and initiating the pass-through mode after determining that no log for the consumer remains in the write cache for de-staging to the backing store, including routing a second new write I/O request to the backing store rather than routing the second new write I/O request to the write cache.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Figure 1:
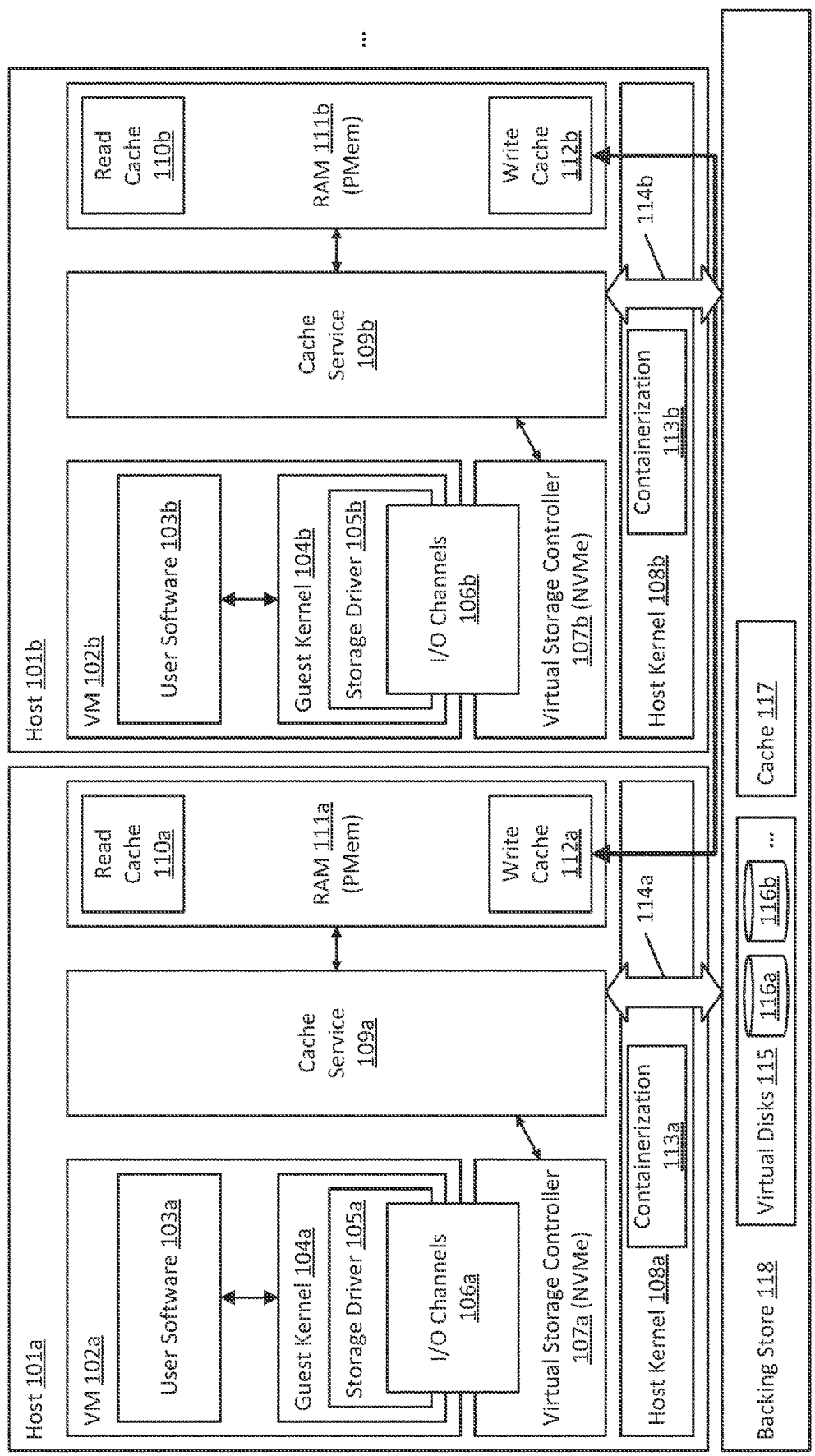
FIG. 1 illustrates an example of a computer architecture that includes a host cache service operating within a cloud environment.

The performance of cloud environments is closely tied to the performance of storage Input/Output (I/O) operations within those environments. For example, the performance of a virtual machine (VM) or container can be significantly impacted by the performance of storage I/O operations used by the VM or container to access (e.g., read from or write to) a virtual disk. Some embodiments described herein are operable within the context of a host cache (e.g., a cache service operating at a VM/container host) that improves the performance of I/O operations of a consumer, such as the I/O operations of a hosted VM or container when accessing a virtual disk.

In some embodiments, a host cache utilizes persistent memory (PMem) technology to improve storage I/O performance within a cloud environment. PMem refers to non-volatile memory technologies (e.g., INTEL OPTANE, SAMSUNG Z-NAND) that retain stored contents through power cycles. This contrasts with conventional volatile memory technologies such as dynamic random-access memory (DRAM) that lose stored contents through power cycles. Some PMem technology is available as non-volatile media that fits in a computer's standard memory slot (e.g., Dual Inline Memory Module, or DIMM, memory slot) and is thus addressable as random-access memory (RAM).

In some embodiments, a host cache utilizes Non-Volatile Memory Express (NVMe) technologies to improve storage I/O performance within a cloud environment. NVMe refers to a type of non-volatile block storage technology that uses the Peripheral Component Interconnect Express (PCIe) bus and is designed to leverage the capabilities of high-speed storage devices like solid-state drives (SSDs), providing faster data transfer rates compared to traditional storage interfaces (e.g., Serial AT Attachment (SATA)). NVMe devices are particularly beneficial in data-intensive applications due to their low latency I/O and high I/O throughput compared to SATA devices. NVMe devices can also support multiple I/O queues, which further enhance their performance capabilities.

Currently, PMem devices have slower I/O access times than DRAM, but they provide higher I/O throughput than SSD and NVMe devices. Compared to DRAM, PMem modules come in much larger capacities and are less expensive per gigabyte (GB), but they are more expensive per GB than NVMe. Thus, PMem is often positioned as lower-capacity "top-tier" high-performance non-volatile storage that can be backed in a "lower-tier" by larger-capacity NVMe drives, SSDs, and the like. As a result, PMem is sometimes referred to as "storage-class memory."

In embodiments, a host cache improves the performance of storage I/O operations of consumers, such as VM's or container's access to a virtual disk, by utilizing NVMe protocols. For example, some embodiments use a virtual NVMe controller to expose virtual disks to VMs and/or containers, enabling those VMs/containers to utilize NVMe queues, buffers, control registers, etc., directly. Additionally, or alternatively, a host cache improves the performance of storage I/O operations of VMs and/or containers to their virtual disks by leveraging PMem as high-performance non-volatile storage for caching reads and/or writes.

In embodiments, a host cache replicates cached writes between hosts. This replication ensures data reliability and availability. For example, absent replication, if a host were to go down or otherwise become unresponsive before persisting a cached write from a write cache (e.g., within RAM, such as DRAM or PMem) to a backing store, that cached write could become temporarily unavailable or even be lost. Thus, in embodiments, host cache service instances at different hosts cooperate with one another to replicate cached writes across the hosts, ensuring the reliability and availability of those cached writes before they are persisted to a backing store. Some embodiments are directed to a novel replication model for a write cache that provides strong consistency semantics, non-blocking write committing, and failover orchestration. In one example, this replication model is applied to a PMem-based block write cache used to cache write I/O requests by VMs (e.g., NVMe-based write I/O requests) prior to those writes being persisted to a virtual disk.

While a write cache offers many benefits to consumers (e.g., VMs, containers), at times, it may be beneficial for a consumer's writes to bypass the write cache. For example, there may be repeated replication failures (e.g., an inability to replicate to sufficient secondaries) at the write cache level due to network instability. Additionally, bypassing a write cache can be a helpful step in VM or container migration (e.g., from one host to another host) to ensure that all of the VM's/container's outstanding writes have been committed to its virtual disk prior to migration. Furthermore, bypassing a write cache may be beneficial for some VM/container workloads and/or for testing scenarios (e.g., by minimizing write I/O latency). Thus, in embodiments, a host cache provides the ability to switch dynamically between a write caching mode and a pass-through mode for one or more consumers. Various embodiments switch a write cache from operating in the write caching mode to the pass-through mode in response to the detection of a failure condition (e.g., I/O errors), in response to a user request (e.g., from a VM/container administrator, from a VM/container host administrator), or as part of another process (e.g., VM/container migration). Embodiments include de-staging write cache logs from one or more replica sets of a host cache and, once the logs have been de-staged, routing write I/O requests to a backing store rather than the replica set(s).

FIG. 1 illustrates an example of a host cache service operating within a cloud environment 100. In FIG. 1, cloud environment 100 includes hosts (e.g., host 101a, host 101b; collectively, hosts 101). An ellipsis to the right of host 101b indicates that hosts 101 can include any number of hosts (e.g., one or more hosts). In embodiments, each host is a VM host and/or a container host. Cloud environment 100 also includes a backing store 118 (or a plurality of backing stores) storing, e.g., virtual disks 115 (e.g., virtual disk 116a, virtual disk 116b) for use by VMs/containers operating at hosts 101, caches (e.g., cache 117), etc.

In the example of FIG. 1, each host of hosts 101 includes a corresponding host operating system (OS) including a corresponding host kernel (e.g., host kernel 108a, host kernel 108b) that each includes (or interoperates with) a containerization component (e.g., containerization component 113a, containerization component 113b) that supports the creation of one or more VMs and/or one or more containers at the host. Examples of containerization components include a hypervisor (or elements of a hypervisor stack) and a containerization engine (e.g., AZURE container services, DOCKER, LINUX Containers). In FIG. 1, each host of hosts 101 executes a VM (e.g., VM 102a, VM 102b). VM 102a and VM 102b are each shown as including a guest kernel (e.g., guest kernel 104a, guest kernel 104b) and user software (e.g., user software 103a, user software 103b).

In FIG. 1, each host of hosts 101 includes an instance of a host cache service 109 (e.g., host cache service instance 109a, host cache service instance 109b). In embodiments, a storage driver (e.g., storage driver 105a, storage driver 105b) at each VM/container interacts, via one or more I/O channels (e.g., I/O channels 106a, I/O channels 106b), with a virtual storage controller (e.g., virtual storage controller 107a, virtual storage controller 107b) for its I/O operations, such as I/O operations for accessing virtual disks 115. In embodiments, each instance of host cache service 109 communicates with a virtual storage controller to cache these I/O operations. As one example, in FIG. 1, the virtual storage controllers are shown as being virtual NVMe controllers. In this example, the I/O channels comprise NVMe queues (e.g., administrative queues, submission queues, completion queues), buffers, control registers, and the like.

In embodiments, each instance of host cache service 109 at least temporarily caches read I/O requests (e.g., read cache 110a, read cache 110b) and/or write I/O requests (e.g., write cache 112a, write cache 112b) in memory (e.g., RAM 111a, RAM 111b). As shown, in some embodiments, memory includes non-volatile PMem. For example, a read cache stores data that has been read (and/or that is predicted to be read) by VMs from backing store 118 (e.g., virtual disks 115), which can improve read I/O performance for those VMs (e.g., by serving reads from the read cache if that data is read more than once). A write cache, on the other hand, stores data that has been written by VMs to virtual disks 115 prior to persisting that data to backing store 118 (e.g., virtual disks 115, cache 117). Write caching allows for faster write operations, as the data can be written to the write cache in memory quickly and then be written to the backing store 118 at a later time, such as when the backing store 118 is less busy. Because, in some embodiments, host cache service 109 caches reads and/or writes by VMs to their virtual disks, host cache service 109 is block-based (e.g., each cached read/write corresponds to one or more filesystem blocks).

In embodiments, and as indicated by arrow 114a and arrow 114b, each instance of host cache service 109 may persist (e.g., de-stage) cached writes from memory to backing store 118 (e.g., to virtual disks 115, to cache 117). In addition, an arrow that connects write cache 112a and write cache 112b indicates that, in some embodiments, host cache service 109 replicates cached writes from one host to another (e.g., from host 101a to host 101b, or vice versa).

In embodiments, each write cache (write cache 112a, write cache 112b) is a write-ahead log that is stored as one or more ring buffers in memory (e.g., RAM 111a, RAM 111b). Write-ahead logging (WAL) refers to techniques for providing atomicity and durability in database systems. Write-ahead logs generally include append-only data structures that are used for crash and transaction recovery. With WAL, changes are first recorded as a log entry in a log (e.g., write cache 112a, write cache 112b) and are then written to stable storage (e.g., backing store 118) before the changes are considered committed. A ring buffer is a data structure that uses a single, fixed-size buffer as if connected end-to-end. That is, once the size of the buffer is exceeded, a new buffer replaces the oldest buffer entry.

In embodiments, for each write I/O request from a VM, host cache service 109 stores a log entry comprising 1) a data portion comprising the data that was written by the VM as part of the write I/O request (e.g., one or more memory pages in PMem to be persisted to virtual disks 115 as one or more filesystem blocks), and 2) a metadata portion describing the log entry and the write—e.g., a log identifier, a logical block address (LBA) for the filesystem block(s), and the like. In embodiments, data portions have a size that aligns cleanly in memory, including in a central processing unit (CPU) cache. For example, if a data portion represents n memory page(s), then the data portion is sized as a multiple of a memory page size (e.g., a multiple of four kilobytes (KB), a multiple of sixteen KB). If the metadata portion of each log is stored adjacent to its data portion in memory, then this memory alignment is broken. For instance, if the data portion of a log is n memory pages, and the metadata portion of that log is 32 bytes, then that log would require the entirety of n memory pages plus 32 bytes of a final memory page, which wastes most of the final memory page. Additionally, logs sized as n memory pages plus metadata would not fit cleanly across CPU cache lines, eliminating the ability to apply bitwise operations (e.g., for address searching).

Figure 2:
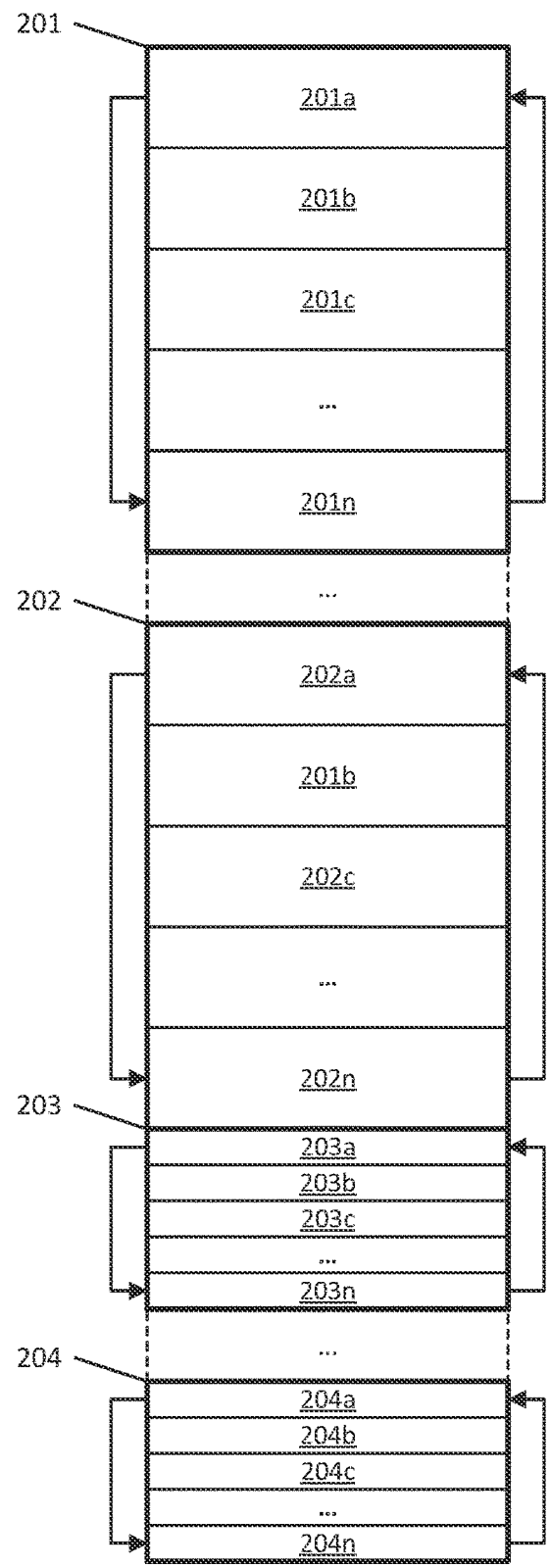
FIG. 2 illustrates an example of storing multiple data and metadata rings within a memory.

In some embodiments, a given ring buffer comprises separate data and metadata rings, which enables host cache service 109 to maintain clean memory alignments when storing write cache logs. For example, FIG. 2 illustrates an example 200 of storing multiple data and metadata rings within a memory. In example 200, memory is shown as storing a data ring 201 and a data ring 202, each comprising a plurality of entries (e.g., entry 201a to entry 201n for data ring 201 and entry 202a to entry 202n for data ring 202). Arrows indicate that entries are used circularly within each data ring, and an ellipsis within each data ring indicates that a data ring can comprise any number of entries. As indicated by an ellipsis between data ring 201 and data ring 202, in embodiments, a memory can store any number of data rings (e.g., one or more data rings). In some embodiments, multiple data rings are stored contiguously within the memory (e.g., one after the other).

In example 200, the memory is shown as also storing a metadata ring 203 and a metadata ring 204, each comprising a plurality of entries (e.g., entry 203a to entry 203n for metadata ring 203 and entry 204a to entry 204n for metadata ring 204). Arrows indicate that entries are used circularly within each metadata ring, and an ellipsis within each metadata ring indicates that a metadata ring can comprise any number of entries. As indicated by an ellipsis between metadata ring 203 and metadata ring 204, in embodiments, a memory can store any number of metadata rings (e.g., one or more metadata rings). In some embodiments, multiple metadata rings are stored contiguously within the memory (e.g., one after the other). In some embodiments, a block of data rings and a block of metadata rings are stored contiguously with each other within the memory (e.g., contiguous data rings, then contiguous metadata rings).

In embodiments, each metadata ring corresponds to a different data ring, forming a distinct ring buffer. For example, in example 200, metadata ring 203 corresponds to data ring 201 (e.g., a first ring buffer), and metadata ring 204 corresponds to data ring 202 (e.g., a second ring buffer). In embodiments, each entry in a metadata ring corresponds to a corresponding entry in a data ring (and vice versa). For example, entries 203a-203n correspond to entries 201a-201n, respectively, and entries 204a-204n correspond to entries 202a-202n, respectively. In embodiments, by storing data and metadata in separate rings, as shown in example 200, host cache service 109 can ensure that data and metadata are aligned to memory page boundaries, which minimizes (and even eliminates) any wasted memory that would result if data and metadata were stored together.

In some embodiments, each ring buffer corresponds to a different entity, such as a VM or container, for which data is cached by host cache service 109. This enables the data cached for each entity to be separated and localized within memory. In other embodiments, each ring buffer corresponds to a plurality of different entities, such as VM(s) and/or container(s). In either embodiment, a number and/or a size of ring buffers at a given host is dynamically adjustable by a host cache instance at the host, thereby enabling efficient adjustment of the size of a write cache utilized for a single entity or for a plurality of entities.

As mentioned above, in some embodiments, host cache service 109 replicates cached writes between hosts, ensuring data reliability and availability. For example, absent replication, if host 101a were to go down (e.g., crash, power down) or become unresponsive before persisting a log from write cache 112a to backing store 118 (e.g., cache 117), that log could become temporarily unavailable (e.g., until host 101a is brought back up or becomes responsive again) or even be lost. Thus, in embodiments, instances of host cache service 109 at different hosts (e.g., host cache service instance 109a at host 101a, host cache service instance 109b at host 101b) cooperate with one another to replicate cached writes across the hosts, ensuring the reliability and availability of those cached writes before they are persisted to a backing store (e.g., backing store 118).

Embodiments, therefore, include a replication model for a block-based write cache, such as write cache 112, that provides strong consistency semantics, non-blocking write committing, and failover orchestration. In embodiments, instances of host cache service 109 commit a write I/O operation (e.g., acknowledge completion of the write I/O operation to a consumer, such as a VM, a container, a virtual storage controller, a storage driver, etc.) after replication of that operation's corresponding data to one or more other instances of host cache service 109 has been completed. This means that a write I/O operation can be committed before the data written by the operation has been de-staged to backing store 118 while ensuring the reliability and availability of the data written. This also means that the de-staging of cached data to backing store 118 can be performed asynchronously with the processing of write I/O requests. In embodiments, committing a write I/O operation prior to that data being written to a backing store shortens the I/O path for the I/O operation, which enables lower latency for write I/O operations than would be possible absent the host cache service 109, as described herein.

Figure 3A:
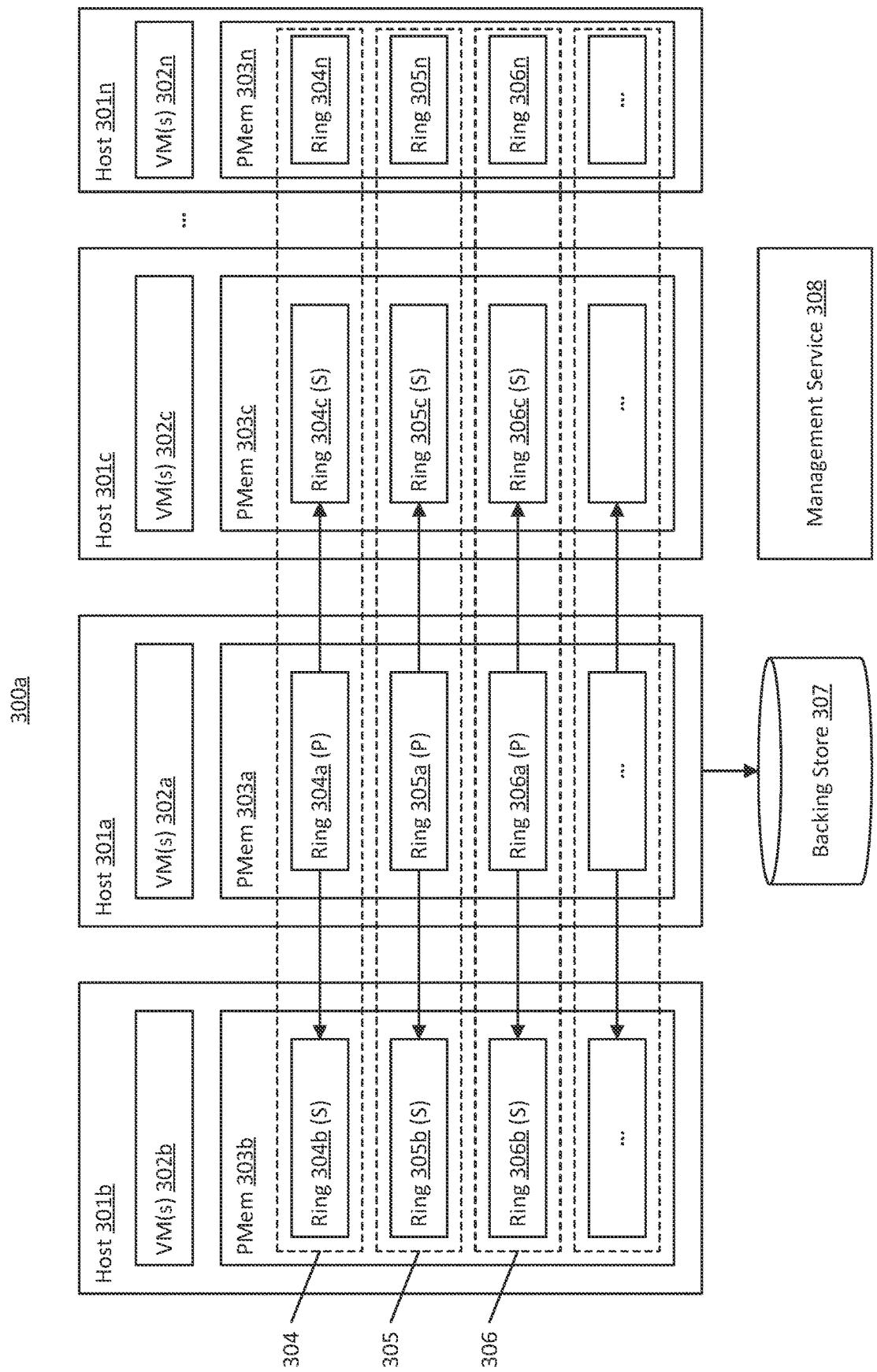
FIGS. 3A-3B illustrate examples of the operation of a replication model for a block-based write cache.

FIG. 3A illustrates an example 300a of the operation of a replication model for a block-based write cache. Example 300a includes a plurality of hosts, including host 301a-301n (collectively, hosts 301). In example 300a, each host of hosts 301 includes one or more corresponding VMs (e.g., VM(s) 302a at host 301a, VM(s) 302b at host 301b, VM(s) 302c at host 301c, VM(s) 302n at host 301n) and operates as a VM/container host. Additionally, in example 300a, each host of hosts 301 includes corresponding PMem (e.g., PMem 303a at host 301a, PMem 303b at host 301b, PMem 303c at host 301c, PMem 303n at host 301n) that is utilized for storing a block-based write cache. In one example, each host of hosts 301 corresponds to a different host of hosts 101. In embodiments, an instance of host cache service 109 at each host of hosts 301 caches writes by the VM(s)/containers operating at the host prior to de-staging those cached writes to a backing store 307 (e.g., to the virtual disk(s) utilized by the VMs/containers that are stored on backing store 307). Notably, however, in some embodiments, one or more of hosts 301 may include an instance of host cache service 109, without operating as a VM/container host. In these embodiments, the host would participate in the write cache replication model described herein, without hosting any VMs/containers.

FIG. 3A illustrates a plurality of replica sets, including replica set 304, 305, and 306, which are used to cache writes by VM(s)/containers before de-staging those writes to backing store 307. An additional replica set is indicated with an ellipsis, showing that embodiments can operate with any number of replica sets (e.g., one or more replica sets). A replica set is a group of data copies (replicas) that are kept synchronized across different servers or storage locations. As shown, each replica set comprises a plurality of ring buffers spread across the hosts. In particular, example 300a shows replica set 304 as including each of ring buffer 304a to ring buffer 304n, shows replica set 305 as including each of ring buffer 305a to ring buffer 305n, and shows replica set 306 as including each of ring buffer 306a to ring buffer 306n. As mentioned, in embodiments, each ring buffer comprises a metadata ring and a data ring, which stores writes as logs.

In the replication model disclosed herein, each replica set comprises a primary ring buffer, and one or more secondary ring buffers spread across the hosts. In embodiments, when an instance of host cache service 109 receives a write I/O request from a consumer (e.g., VM, container, storage controller), the instance places a log in a primary ring buffer (e.g., ring buffer 304a) and then replicates the write to the secondary ring buffers in the replica set (e.g., ring buffer 304b and ring buffer 304c). In example 300a, referring to replica set 304, ring buffer 304a is primary, while ring buffer 304b to ring buffer 304n is secondary. Referring to replica set 305, ring buffer 305a is primary, while ring buffer 305b to ring buffer 305n is secondary. Referring to replica set 306, ring buffer 306a is primary, while ring buffer 306b to ring buffer 306n is secondary. In example 300a, the primary ring buffers are all illustrated as residing at the same host (e.g., ring buffer 304a, 305a, and 306a at host 301a). However, in other examples, primary ring buffers are distributed across the hosts (e.g., ring buffer 305a may be primary for replica set 305 while ring buffer 305a is secondary; and ring buffer 306c may be primary for replica set 306 while ring buffer 306a is secondary).

In embodiments, an instance of host cache service 109 commits a write (e.g., acknowledges competition of the write to a consumer, such as VM(s) 302a or a storage controller being used by VM(s) 302a) when a corresponding log entry is replicated from a primary ring buffer (e.g., ring buffer 304a) within a replica set (e.g., replica set 304) to all secondary ring buffers (e.g., ring buffer 304b and ring buffer 304c) within the replica set. Thus, there is a consistency of committed log entries across replicas within a given replica set. In embodiments, an instance of host cache service 109 de-stages a log entry from a primary ring buffer (e.g., ring buffer 304a) to the backing store 307 once the corresponding write has been committed. For example, an instance of host cache service 109 operating at host 301a de-stages a log entry from ring buffer 304a to a virtual disk image on backing store 307 once the instance of host cache service 109 has successfully replicated the log entry to ring buffer 304b and ring buffer 304c and acknowledged the write to VM(s) 302a.

An ellipsis between host 301c and host 301n indicates that embodiments can operate with a variety of numbers of hosts (e.g., two or more hosts). For example, for a given replica set (e.g., replica set 304), embodiments may operate with one host (e.g., host 301a) that stores a primary ring buffer (e.g., ring buffer 304a) and one or hosts (e.g., one or more of host 301b-301n) each store a different secondary ring buffer (e.g., ring buffer 304b to ring buffer 304n).

In embodiments, for each consumer (e.g., VM/container), host cache service 109 maintains a replica list that identifies one or more replica sets that are used to cache writes by that consumer. In example 300a, for instance, host cache service 109 may utilize each of replica set 304 to replica set 306 to cache writes to a virtual disk image used by one of VM(s) 302a. In embodiments, host cache service 109 utilizes a given replica set (e.g., replica set 304) for new log entries until that replica set's primary ring buffer (e.g., ring buffer 304a) is full and then moves on to another replica set (e.g., replica set 305) in the replica list, adding new log entries to that replica set's primary ring buffer (e.g., ring buffer 305a). At the same time, host cache service 109 asynchronously de-stages log entries from the replica sets as writes are replicated and committed (e.g., host cache service 109 de-stages log entries from replica set 304, 305, and/or 306 while adding new log entries to replica set 305). In embodiments, host cache service 109 chooses which replica set in a replica list to use next based on round-robin order, based on a random selection, based on priority order, and the like. In embodiments, a given replica set may be exclusive to a single consumer or may be shared by more than one consumer. In embodiments, increasing the number of replica sets assigned to a consumer increases the size of the write cache for that consumer.

In embodiments, host cache service 109 implements a replication model that quickly and gracefully handles the failure of both a host hosting a primary ring buffer and a host hosting a secondary ring buffer. Referring to a secondary failure, in embodiments, when an instance of host cache service 109 is not able to commit a write due to a secondary failure (e.g., the instance cannot replicate a log to all secondary ring buffers), the instance chooses another replica set from the replica list and attempts to cache the write to that replica set. If the host cache service 109 is not able to commit a write due to this other replica set, it moves on to yet another replica set in the replica list, and so on. This means that the replication model avoids blocks of write commits when there is a secondary failure.

Figure 3B:
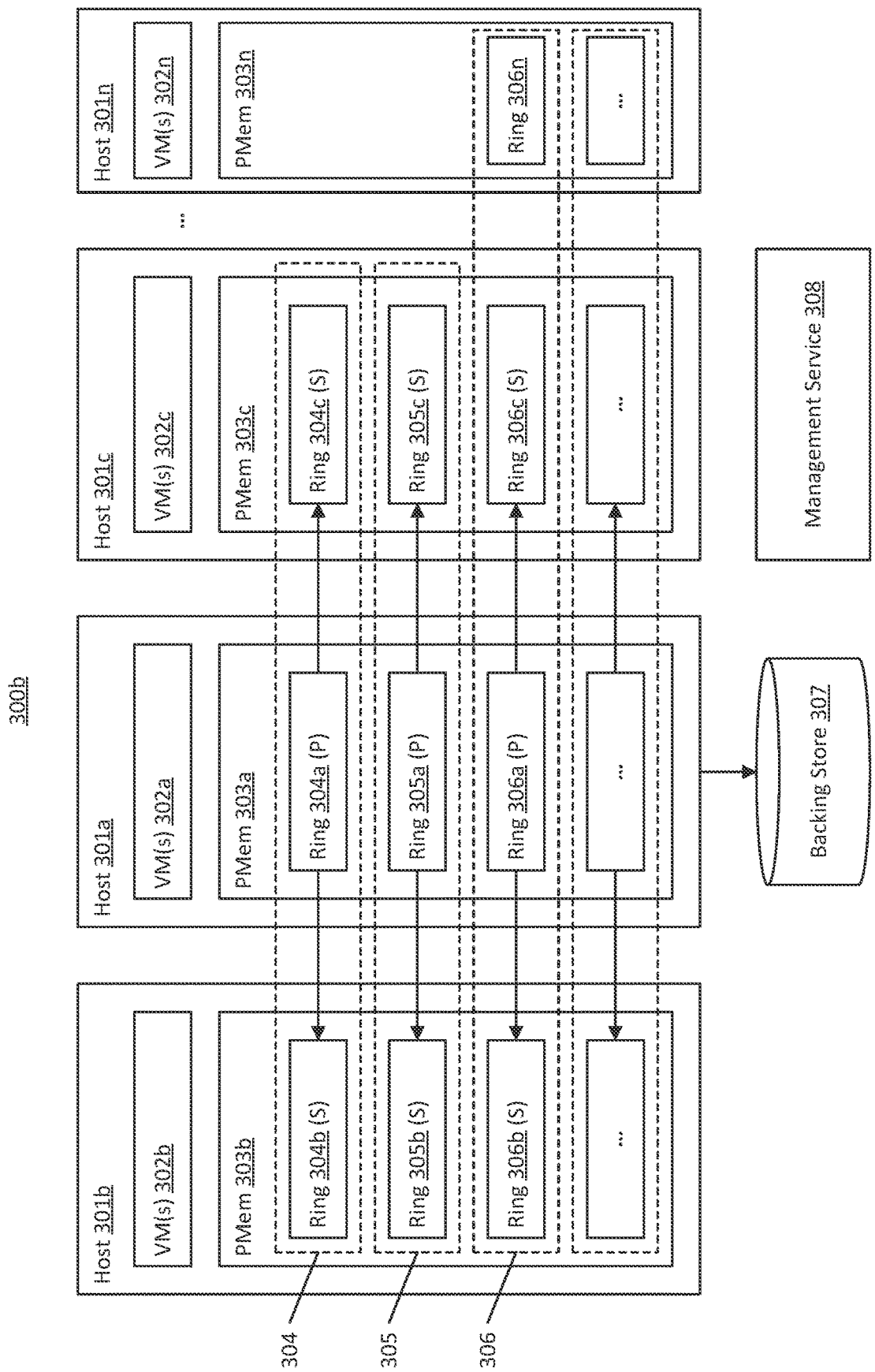

For instance, in example 300b of FIG. 3B, replica set 304 includes each of ring buffer 304a to ring buffer 304c (host 301a to host 301c, respectively), replica set 305 includes each of ring buffer 305a to ring buffer 305c (host 301a to host 301c, respectively), and replica set 306 includes each of ring buffer 305a to ring buffer 305n (host 301a to host 301n, respectively). If host 301b goes down or becomes unresponsive, an instance of host cache service 109 operating at host 301a may successfully replicate a log entry from ring buffer 304a to ring buffer 304c but fail to replicate the log entry to ring buffer 304b. As a result, the instance seals the replica set 304, switches to replica set 305, and attempts to complete the write. In embodiments, sealing a replica set includes rolling back uncommitted log entries within the replica set, ceasing further log entry additions to the replica set, and the like. Again, the instance may successfully replicate a log entry from ring buffer 305a to ring buffer 305c but fail to replicate the log entry to ring buffer 305b. Thus, the instance seals replica set 305, switches to replica set 306, and again attempts to complete the write. Now, the instance may fail to replicate a log entry from ring buffer 306a to ring buffer 306b but succeed in replicating the log entry to ring buffer 306c and 306n. Thus, the instance can commit and de-stage the write.

Referring to a primary failure, in embodiments, when a host hosting a primary ring buffer dies, any host hosting a secondary ring buffer of the same replica is elected as a de-stage primary and de-stages any pending logs in its ring buffer. For example, continuing the example 300b of FIG. 3B, if host 301a also goes down or becomes unresponsive, host 301c may be elected as de-stage primary for any or all of replica set 304-306. An instance of host cache service 109 at host 301c then proceeds to de-stage any pending logs from the secondary ring buffer for any replica set for which it is elected as de-stage primary to backing store 307.

In embodiments, if the new de-stage primary fails (e.g., host 301c also goes down or becomes unresponsive), a new de-stage primary (e.g., host 301n for replica set 306) can be elected, and that new de-stage primary can de-stage any pending logs in its secondary ring buffer from the beginning (e.g., without regard for the de-staging accomplished by the prior de-stage primary). Thus, failover de-stage can be done by any available replica at any time when there is a primary failure.

In some embodiments, a primary failover is orchestrated by a management service 308 that has a global view of the cluster. For example, management service 308 may have knowledge of the hosts in the cluster, which replica sets have ring buffers at each host, which of those ring buffers are primary and secondary, and the like. Thus, to orchestrate primary failover, management service 308 chooses a host to be de-stage primary, instructs that host to begin de-staging pending logs, receives confirmation from the de-stage primary when de-staging is complete, etc. In other embodiments, a primary failover is orchestrated in a peer-to-peer manner based on communications between the instances of host cache service 109 at each host.

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

Referring to the failure of a secondary, embodiments are now described in connection with FIG. 4, which illustrates a flow chart of an example method 400 for failure handling for the loss of a secondary in a replication model for a block-based write cache. In embodiments, instructions for implementing method 400 are encoded as computer-executable instructions stored on a computer storage media that are executable by a processor to cause a computer system (e.g., host 301a) to perform method 400.

Figure 4:
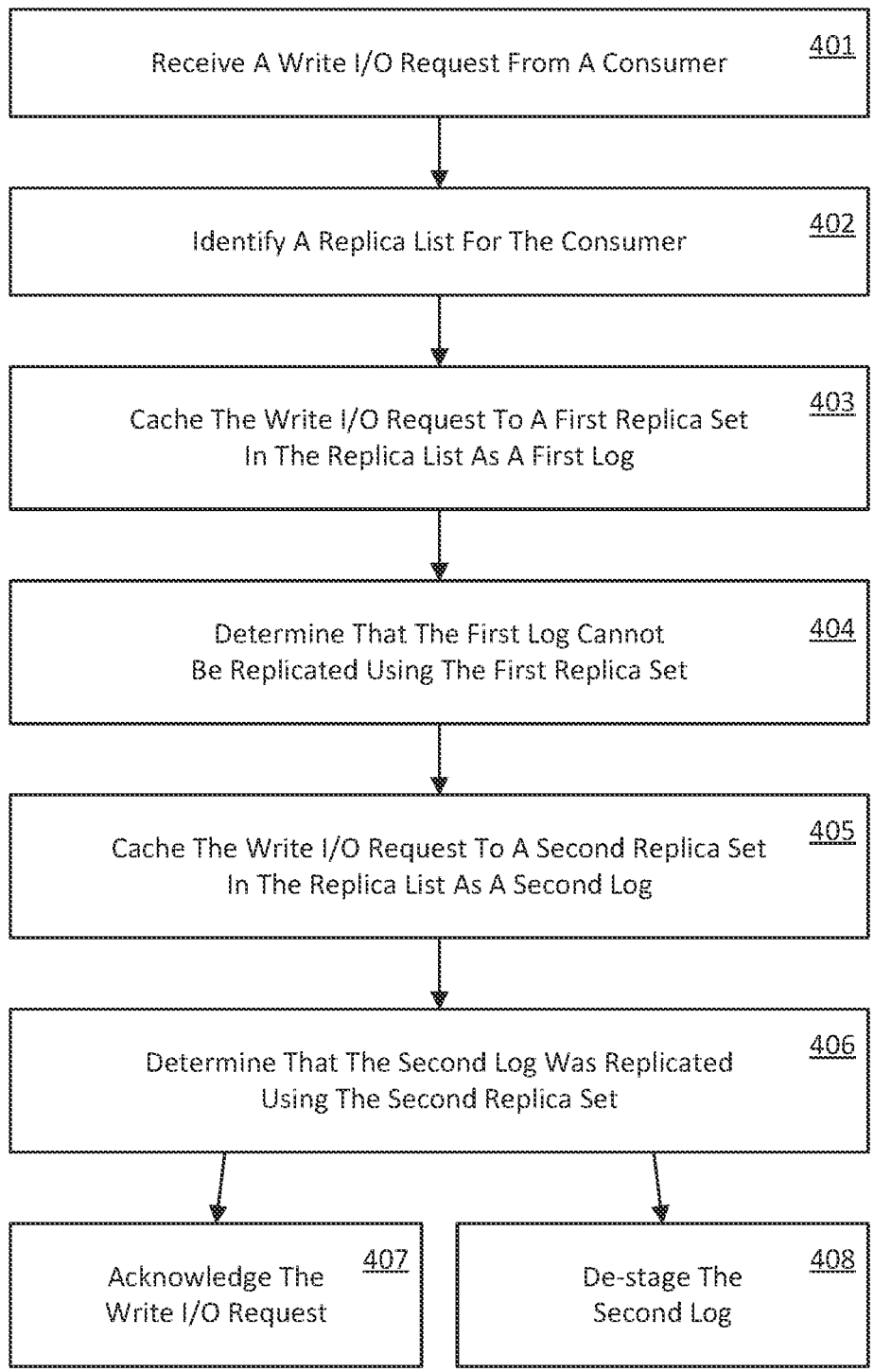
FIG. 4 illustrates a flow chart of an example method for failure handling for the loss of a secondary in a replication model for a block-based write cache.

Referring to FIG. 4, in embodiments, method 400 comprises act 401 of receiving a write I/O operation from a consumer. In embodiments, the consumer is a VM or a container executing in the computer system, a storage controller, and the like. For example, referring to FIG. 3B, an instance of host cache service 109 operating at host 301a receives a write I/O request originating from one of VM(s) 302a.

Method 400 also comprises act 402 of identifying a replica list for the consumer. In some embodiments, act 402 comprises identifying a replica list associated with the consumer, the replica list specifying a first replica set and a second replica set. For example, in embodiments, each consumer (e.g., VM) has a replica list associated with it, with that replica list specifying a set of replica sets to use for that consumer. Thus, the instance of host cache service 109 operating at host 301a identifies a replica list associated with the VM that ordinated the write I/O request. In one example, the replica list includes replica set 305 (e.g., the first replica set) and replica set 306 (e.g., the second replica set). In some examples, the replica list is associated with a single consumer (e.g., a single VM/container) or with a plurality of consumers (e.g., a plurality of VMs/containers). In some embodiments, a remote management service (e.g., management service 308) maintains the replica list, including associating one more consumers with the replica list.

Method 400 also comprises act 403 of caching the write I/O request to a first replica set in the replica list as a first log. In some embodiments, act 403 comprises selecting the first replica set for caching the write I/O operation, and adding a first log corresponding to the write I/O operation to a primary ring buffer of the first replica set, the primary ring buffer of the first replica set being stored in the computer system. For example, the instance of host cache service 109 operating at host 301*a* chooses replica set 305 and adds a log corresponding to the write I/O request to ring buffer 305*a*.

Method 400 also comprises act 404 of determining that the first log cannot be replicated using the first replica set. In some embodiments, act 404 comprises determining that the first log cannot be replicated to a secondary ring buffer of the first replica set, the secondary ring buffer of the first replica set being stored in a first secondary computer system. For example, because host 301*b* is down, the instance of host cache service 109 operating at host 301*a* cannot replicate the log from ring buffer 305*a* to ring buffer 305*b*. In some embodiments, due to the failure to replicate to the secondary ring buffer, there is a failure to replicate to all secondary ring buffers within the replica set. Thus, in embodiments, act 404 includes determining that the first log cannot be replicated to all secondary ring buffers of the first replica set.

Method 400 also comprises act 405 of caching the write I/O request to a second replica set in the replica list as a second log (e.g., in which the first log and second log both correspond to the write I/O operation received in act 401). In some embodiments, act 405 comprises selecting the second replica set for caching the write I/O operation, based on determining that the first log cannot be replicated to the secondary ring buffer of the first replica set, and adding a second log corresponding to the write I/O operation to a primary ring buffer of the second replica set, the primary ring buffer of the second replica set being stored in the computer system. For example, due to the failure to replicate within replica set 305, the instance of host cache service 109 operating at host 301*a* chooses replica set 306 and adds a log corresponding to the write I/O request to ring buffer 306*a*.

Method 400 also comprises act 406 of determining that the second log was replicated using the second replica set. In some embodiments, act 406 comprises determining that the second log has been replicated to a secondary ring buffer of the second replica set, the secondary ring buffer of the second replica set being in a second secondary computer system. For example, because host 301*b* is down, the instance of host cache service 109 operating at host 301*a* cannot replicate the log from ring buffer 306*a* to ring buffer 305*b*. However, because the instance can replicate the log from ring buffer 306*a* to ring buffer 306*n*. In embodiments, due to the replication to ring buffer 306*n*, act 406 comprises determining that the second log has been replicated to all secondary ring buffers of the second replica set.

Due to the replication in act 406, the instance of host cache service 109 operating at host 301*a* can commit and de-stage the write. Thus, after act 406, method 400 also comprises act 407 of acknowledging the write I/O request and act 408 of destaging the second log. Notably, there is no ordering specified between act 407 and act 408. Thus, in various embodiments, these acts could be performed serially (in either order), or at least partially in parallel.

In some embodiments, act 407 comprises based on determining that the second log has been replicated to the secondary ring buffer of the second replica set, acknowledging the write I/O operation to the consumer. For example, the instance of host cache service 109 acknowledges completion of the write to the VM that originated the write in act 401.

In some embodiments, act 408 comprises based on determining that the second log has been replicated to the secondary ring buffer of the second replica set, de-staging the second log to a backing store. For example, the instance of host cache service 109 de-stages the log corresponding to the write from ring buffer 306*a* to backing store 307. In some embodiments, de-staging the second log to the backing store comprises de-staging the second log to a virtual disk corresponding to the VM or the container.

As mentioned, in embodiments, host write caches are stored in PMem. Thus, in embodiments, the primary ring buffer of the first replica set is stored in a first persistent memory (e.g., PMem 303*a*) in the computer system, the primary ring buffer of the second replica set is stored in the first persistent memory in the computer system, the secondary ring buffer of the first replica set is stored in a second persistent memory (e.g., PMem 303*b*) in the first secondary computer system, and the secondary ring buffer of the second replica set is stored in a third persistent memory (e.g., PMem 303*n*) in the second secondary computer system.

As mentioned, in addition to switching replica sets for failover, the replication model disclosed herein can switch replica sets when a current replica set is full. Thus, for example, in embodiments, the write I/O operation is a first write I/O operation, the replica list also specifies a third replica set, and the method 400 further comprises: receiving second write I/O operation from the consumer; selecting the second replica set for caching the write I/O operation; determining that the primary ring buffer of the second replica set is full; selecting the third replica set for caching the write I/O operation, based on determining that the primary ring buffer of the second replica set is full; adding a third log corresponding to the second write I/O operation to a primary ring buffer of the third replica set, the primary ring buffer of the third replica set being stored in the computer system; determining that the third log has been replicated to all secondary ring buffers of the third replica set; and based on determining that the third log has been replicated all secondary ring buffers of the third replica set, acknowledging the second write I/O operation to the consumer; and de-staging the third log to the backing store.

Figure 5:
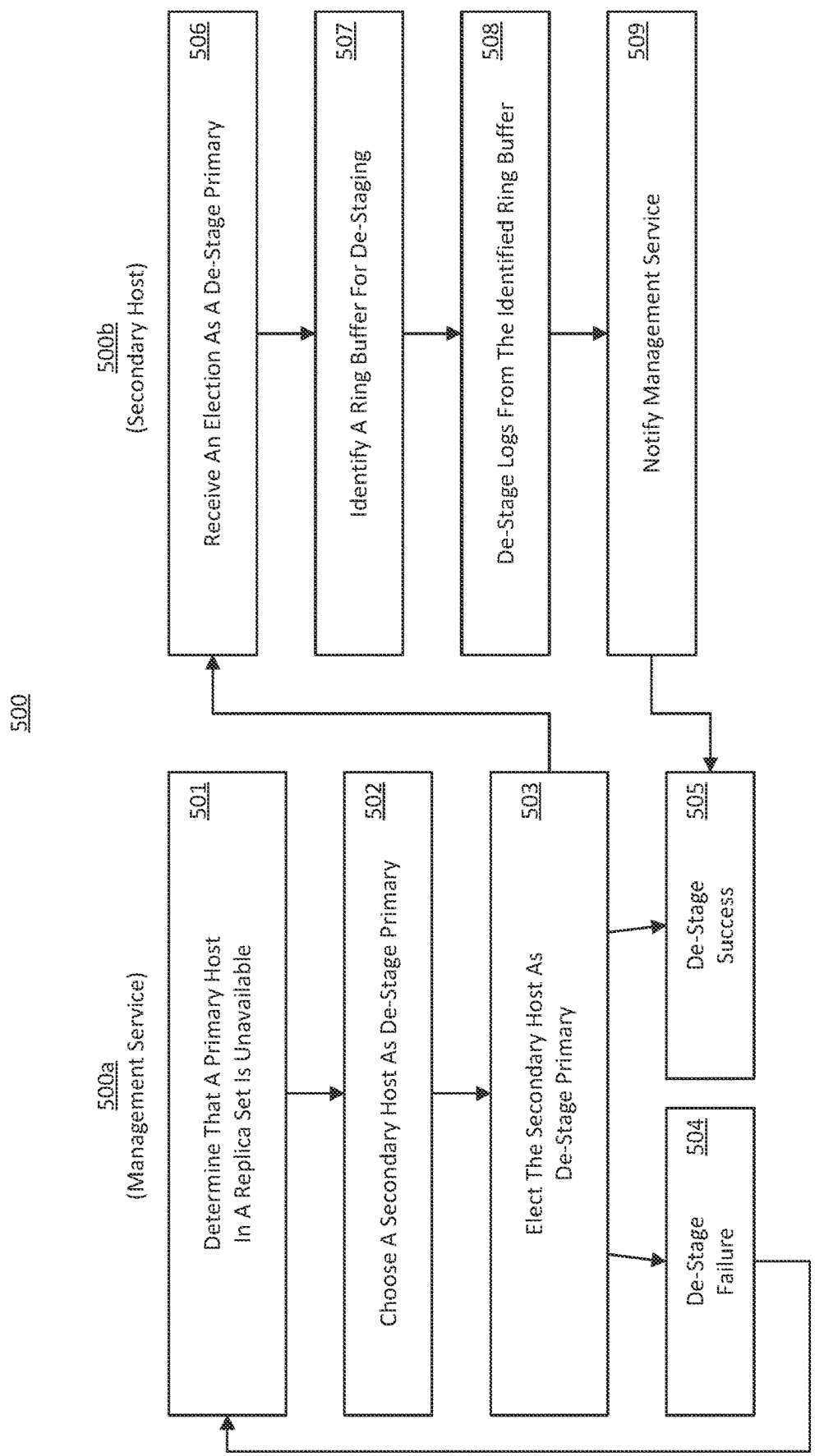
FIG. 5 illustrates a flow chart of an example method for failure handling for the loss of a primary in a replication model for a block-based write cache.

Referring to the failure of a primary, embodiments are now described in connection with FIG. 5, which illustrates a flow chart of an example method 500 for failure handling for the loss of a primary in a replication model for a block-based write cache. As mentioned, in some embodiments, the failover of a primary is orchestrated by management service 308, though other embodiments may orchestrate it via peer-to-peer communications between instances of host cache service 109. In FIG. 5, method 500 includes method 500*a*, performed by a management service (e.g., management service 308), and method 500*b*, performed by a host that has been elected as de-stage primary. In embodiments, instructions for implementing method 500 are encoded as computer-executable instructions stored on one or more computer storage media that are executable by one or more processors to cause one or more computer systems to perform method 500.

Referring to FIG. 5, in embodiments, method 500*a* comprises act 501 of determining that a primary host in a replica set is unavailable. Referring to FIG. 3B, for example, management service 308 determines that host 301*a* has gone down or has become unresponsive (e.g., due to loss of a heartbeat or other signal from an instance of host cache service 109 at host 301*a*).

Method 500*a* also comprises act 502 of choosing a secondary host as de-stage primary, and act 503 of electing the secondary host as de-stage primary. Referring to FIG.

3B, for example, management service 308 chooses host 301*c* to be the de-stage primary for any or all of replica set 304 to replica set 306. An arrow connecting act and act 506 indicates that electing the secondary host as de-stage primary includes communicating the election to the chosen host.

Referring to method 500*b*, method 500*b* comprises act 506 of receiving an election as a de-stage primary. In some embodiments, act 506 comprises receiving an election as a de-stage primary host for a replica set, the replica set comprising a primary ring buffer, and one or more secondary ring buffers stored across a plurality of hosts. For example, host 301*c* receives an election as de-stage primary for replica set 304 to replica set 306. In FIG. 5, the election is received from a management service. Thus, in embodiments, receiving the election as the primary host for the replica set comprises receiving the election from a management service. However, other embodiments may operate peer-to-peer, such that receiving the election as the primary host for the replica set comprises receiving the election from one or more secondary hosts.

Method 500*b* also comprises act 507 of identifying a ring buffer for de-staging. In some embodiments, act 507 comprises, based on receiving the election as the de-stage primary host for the replica set, identifying a ring buffer for the replica set that is stored in the computer system, the ring buffer comprising a plurality of logs replicated from the primary ring buffer at a different host of the plurality of hosts, each log corresponding to a different cached write I/O request. For example, referring to replica set 304, an instance of host cache service 109 identifies ring buffer 304*c*; referring to replica set 305, the instance identifies ring buffer 305*c*, and/or referring to replica set 306, the instance identifies ring buffer 306*c*.

Method 500*b* also comprises act 508 of de-staging logs from the identified ring buffer. In some embodiments, act 508 comprises, based on receiving the election as the de-stage primary host for the replica set, de-staging the plurality of logs from the ring buffer to a backing store. For example, referring to replica set 304, the instance of host cache service 109 de-stages logs from ring buffer 304*c* to backing store 307; referring to replica set 305, the instance de-stages logs from ring buffer 305*c* to backing store 307, and/or referring to replica set 306, the instance de-stages logs from ring buffer 306*c* to backing store 307.

In embodiments, each replica set is de-allocated after it has been de-staged. In one example, host 301*c* notifies management service 308 when a replica set has been de-staged, and management service 308 frees up the replica set's corresponding ring buffers. In another example, host 301*c* notifies other hosts when a replica set has been de-staged, and those hosts coordinate to free up the replica set's corresponding ring buffers. In embodiments, freed ring buffers become the basis for new replica set(s).

As shown in act 504, method 500*a* could end with a de-stage failure in act 504, e.g., due to loss of contact with host 301*c* by management service 308. As indicated by an arrow that connects act 504 and act 501, in these situations, method 500*a* can repeat, selecting a different secondary as de-stage primary.

As mentioned, while a write cache offers many benefits to consumers (e.g., VMs, containers), including strong consistency semantics, non-blocking write committing, and failover orchestration, it may be beneficial for a consumer's write I/O requests to bypass the write cache from time to time. The invention provides an ability for host cache service 109 to switch dynamically between caching mode and pass-through mode for one or more consumers.

In some embodiments, a switch from caching mode to pass-through mode is triggered by the detection of a failure condition. In these embodiments, the host cache tracks a number and/or rate of I/O errors that occur during the caching mode (e.g., a number of I/O errors for a given consumer) and switches to the pass-through mode when a threshold condition has been reached (e.g., a number of I/O errors, a rate of I/O errors). These embodiments are useful for maintaining I/O reliability for a consumer in the face of network instability or similar errors that affect the ability of instances of host cache service 109 to reliably replicate logs.

Figure 6:
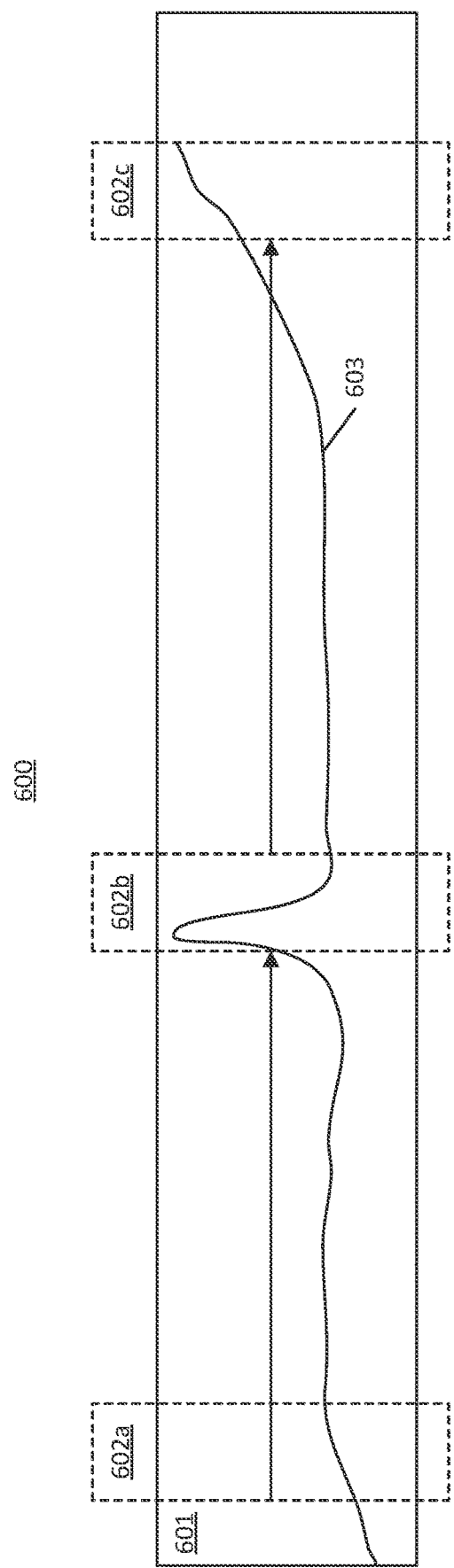
FIG. 6 illustrates an example of using a sliding time window to trigger a transition to a pass-through mode based on input/output (I/O) errors.

Some embodiments track I/O errors (number, rate, etc.) over a sliding window of time and switch to the pass-through mode when I/O errors have reached a threshold amount within that sliding window. For instance, FIG. 6 illustrates an example 600 of using a sliding time window to trigger a transition to a pass-through mode based on I/O errors. In example 600, timeline 601 shows a plot 603 of I/O errors (e.g., number, rate) for a given consumer over time. Example 600 also shows window 602, which is illustrated as continuously moving along with plot 603. Initially, during window 602*a*, the number or rate of I/O errors is relatively low, so a transition to pass-through mode is not triggered. Later, during window 602*b*, the number or rate of I/O errors spikes but quickly tapers off. Because the number/rate of I/O errors does not reach a sufficiently high amount over the span of window 602*a*, a transition to pass-through mode is not triggered. Finally, during window 602*c*, the number or rate of I/O errors rises to a sufficient amount over the span of window 602*c* to trigger a transition to pass-through mode.

In additional or alternative embodiments, a switch from caching mode to pass-through mode is triggered by a user request, such as from a VM/container administrator, from a VM/container host administrator, etc. In embodiments, enabling a switch from caching mode to pass-through mode to be triggered by a user request enables a user to reduce the I/O path length for a VM/container, which may be beneficial for some VM/container workloads and/or for testing scenarios.

In yet additional or alternative embodiments, a switch from caching mode to pass-through mode is triggered as part of another process, such as a VM/container migration. Bypassing a write cache can be a helpful step in VM/container migration (e.g., from one host to another host) to ensure that all of the VM's/container's outstanding writes have been committed to its virtual disk prior to migration.

Regardless of the trigger, in embodiments switching from caching mode to pass-through mode includes host cache service 109 de-staging the logs in all relevant replica sets and, once the logs have been de-staged, routing write I/O requests to the backing store rather than the replica sets. In some situations, the I/O load of the consumer is low enough that the VM's replica sets can be drained of logs without affecting VM performance. In other situations, however, the I/O load of the consumer exceeds the rate at which logs can be de-staged from its replica sets. In these situations, host cache service 109 may introduce latency into the consumer's I/O requests, such as by delaying the committing of an I/O request. This enables the consumer's I/O requests to proceed while slowing them enough that the consumer's replica sets can be drained of all logs. In embodiments, the amount of latency varies dynamically based on the rate of new I/O requests versus the rate of log de-staging.

Embodiments are now described in connection with FIG. 7, which illustrates a flow chart of an example method 700 for transitioning from a write-caching mode to a pass-through mode for a consumer's write I/O requests. In embodiments, instructions for implementing method 700 are encoded as computer-executable instructions stored on a computer storage media that are executable by a processor to cause a computer system (e.g., host 301*a*) to perform method 700.

Figure 7:
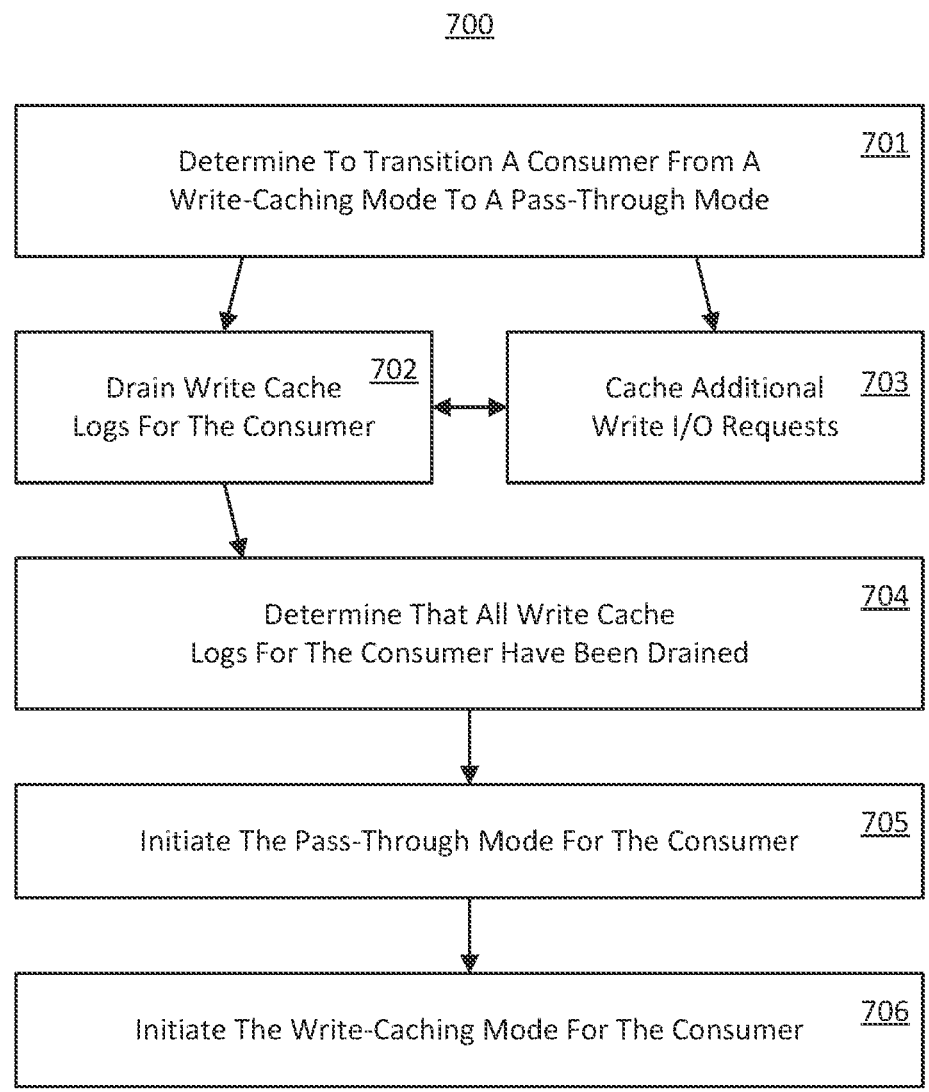
FIG. 7 illustrates a flow chart of an example method for transitioning from a write-caching mode to a pass-through mode for a consumer's write I/O requests.

Referring to FIG. 7, in embodiments, method 700 comprises act 701 of determining to transition a consumer from a write-caching mode to a pass-through mode. In some embodiments, act 701 comprises determining that a condition has been met for transitioning write I/O requests for a consumer from a write-caching mode to a pass-through mode. For example, an instance of host cache service 109 at host 301*a* determines that one or more of VM(s) 302*a* is to be transitioned from write-caching mode to pass-through mode. In various embodiments, the condition for transitioning write I/O requests for the consumer is met when a user request has been identified, when a migration of the consumer has been identified, when an I/O error count for the consumer has reached a first threshold, or when an I/O error rate for the consumer has reached a second threshold. In some embodiments, when the condition is based on an I/O error rate, the condition is evaluated over a sliding window, as described in connection with FIG. 6. Thus, in some embodiments, the condition for transitioning write I/O requests for the consumer is met when the I/O error count for the consumer has reached the first threshold or the I/O error rate for the consumer has reached the second threshold, and the I/O error count for the consumer or the I/O error rate for the consumer is calculated over a sliding time window.

After act 701, method 700 also comprises act 702 of draining write cache logs for the consumer. In some embodiments, act 702 comprises de-staging one or more logs for the consumer from a write cache to a backing store, each log corresponding to a pending write I/O operation by the consumer. For example, the instance of host cache service 109 at host 301*a* de-stages logs for the identified customer from each of replica set 304 to replica set 306 to backing store 307. In some embodiments, the consumer is a VM or a container executing in the computer system, and de-staging the one or more logs for the consumer to the backing store comprises de-staging the one or more logs to a virtual disk corresponding to the VM or the container. In some embodiments, de-staging the one or more logs for the consumer from the write cache to the backing store comprises de-staging the one or more logs from a replica set that is associated with the consumer. In some embodiments, de-staging one or more logs for the consumer from the write cache to the backing store comprises de-staging a log from each of a plurality of replica sets in a replica list that is associated with the consumer.

After act 701, method 700 also comprises act 703 of caching additional write I/O requests. For example, in one embodiment, method 700 further comprises routing an additional write I/O request to the write cache after determining that the condition has been met, but prior to determining that no log for the consumer remains in the write cache for de-staging to the backing store.

As shown, act 702 and act 703 may be performed in parallel, with the progress of each act influencing the other (e.g., indicated by an arrow connecting act 702 and act 703). For example, based on the progress of act 702, act 703 may include throttling new I/OI requests from the consumer. In addition, based on the progress of act 703, act 702 may include prioritizing or de-prioritizing the de-staging process. Thus, embodiment, de-staging the one or more logs for the consumer from the write cache to the backing store comprises introducing latency into the second new write I/O request. In some embodiments, a magnitude of the latency is based on a rate of de-staging the one or more logs for the consumer from the write cache to the backing store and/or a rate of write I/O requests received after identifying the condition for transitioning write I/O requests for the consumer.

Method 700 also comprises act 704 of determining that all write cache logs for the consumer have been drained. In some embodiments, act 704 comprises determining that no log for the consumer remains in the write cache for de-staging to the backing store. For example, the instance of host cache service 109 at host 301 determines that all logs for the identified customer—including logs cached in act 703, if any—have been de-staged from each of replica set 304 to replica set 306 to backing store 307.

Method 700 also comprises act 705 of initiating the pass-through mode for the consumer. In some embodiments, act 705 comprises initiating the pass-through mode after determining that no log for the consumer remains in the write cache for de-staging to the backing store, including routing a new write I/O request to the backing store rather than routing the new write I/O request to the write cache. For example, the instance of host cache service 109 at host 301 routes any further write I/O requests from the consumer to backing store 307, without caching those requests.

In some embodiments, method 700 also comprises act 706 of initiating the write-caching mode for the consumer. For example, at some time after act 705, the instance of host cache service 109 at host 301 determines that the consumer's write I/O requests should be cached again (e.g., due to a user request, due the resolution that led to I/O errors). Thus, in embodiments, method 700 includes determining that write I/O requests for the consumer are to be transitioned from the pass-through mode to the write-caching mode after initiating the pass-through mode and initiating the write-caching mode, including routing a new write I/O request to the write cache.

Alternatively, or in addition to the other examples described herein, examples include any combination of the following:

Clause 1. A method implemented in a computer system that includes a processor system, comprising: receiving a write I/O operation from a consumer; identifying a replica list associated with the consumer, the replica list specifying a first replica set and a second replica set; selecting the first replica set for caching the write I/O operation; adding a first log corresponding to the write I/O operation to a primary ring buffer of the first replica set, the primary ring buffer of the first replica set being stored in the computer system; determining that the first log cannot be replicated to a secondary ring buffer of the first replica set, the secondary ring buffer of the first replica set being stored in a first secondary computer system; selecting the second replica set for caching the write I/O operation, based on determining that the first log cannot be replicated to the secondary ring buffer of the first replica set; adding a second log corresponding to the write I/O operation to a primary ring buffer of the second replica set, the primary ring buffer of the second replica set being stored in the computer system; determining that the second log has been replicated to a secondary ring buffer of the second replica set, the secondary ring buffer of the second replica set being in a second secondary computer system; and based on determining that the second log has been replicated to the secondary ring buffer of the second replica set, acknowledging the write I/O operation to the consumer; and de-staging the second log to a backing store.

Clause 2. The method of clause 1, wherein the consumer is a VM or a container executing in the computer system.

Clause 3. The method of clause 2, wherein de-staging the second log to the backing store comprises de-staging the second log to a virtual disk corresponding to the VM or the container.

Clause 4. The method of any of clauses 1 to 3, wherein, the primary ring buffer of the first replica set is stored in a first persistent memory in the computer system; the primary ring buffer of the second replica set is stored in the first persistent memory in the computer system; the secondary ring buffer of the first replica set is stored in a second persistent memory in the first secondary computer system; and the secondary ring buffer of the second replica set is stored in a third persistent memory in the second secondary computer system.

Clause 5. The method of any of clauses 1 to 4, wherein determining that the first log cannot be replicated to the secondary ring buffer of the first replica set comprises: determining that the first log cannot be replicated to all secondary ring buffers of the first replica set.

Clause 6. The method of any of clauses 1 to 5, wherein determining that the second log has been replicated to the secondary ring buffer of the second replica set comprises: determining that the second log has been replicated to all secondary ring buffers of the second replica set.

Clause 7. The method of any of clauses 1 to 6, wherein the replica list is associated with a plurality of consumers.

Clause 8. The method of clause 7, wherein a remote management service associates the plurality of consumers with the replica list.

Clause 9. The method of any of clauses 1 to 8, wherein, the write I/O operation is a first write I/O operation, the replica list also specifies a third replica set, and the method further comprises: receiving second write I/O operation from the consumer; selecting the second replica set for caching the write I/O operation; determining that the primary ring buffer of the second replica set is full; selecting the third replica set for caching the write I/O operation, based on determining that the primary ring buffer of the second replica set is full; adding a third log corresponding to the second write I/O operation to a primary ring buffer of the third replica set, the primary ring buffer of the third replica set being stored in the computer system; determining that the third log has been replicated to all secondary ring buffers of the third replica set; and based on determining that the third log has been replicated to all secondary ring buffers of the third replica set, acknowledging the second write I/O operation to the consumer; and de-staging the third log to the backing store.

Clause 10. A method implemented in a computer system that includes a processor system, comprising: receiving an election as a de-stage primary host for a replica set, the replica set comprising a primary ring buffer and one or more secondary ring buffers stored across a plurality of hosts; and based on receiving the election as the de-stage primary host for the replica set, identifying a ring buffer for the replica set that is stored in the computer system, the ring buffer comprising a plurality of logs replicated from the primary ring buffer at a different host of the plurality of hosts, each log corresponding to a different cached write I/O request; and de-staging the plurality of logs from the ring buffer to a backing store.

Clause 11. The method of clause 10, wherein receiving the election as the de-stage primary host for the replica set comprises receiving the election from a management service.

Clause 12. The method of any of clauses 10 or 11, wherein receiving the election as the de-stage primary host for the replica set comprises receiving the election from one or more secondary hosts.

Clause 13. The method of any of clauses 10 to 12, wherein the ring buffer is stored in a persistent memory in the computer system.

Clause 14. The method of any of clauses 10 to 13, wherein, receiving the election as the de-stage primary host for the replica set comprises receiving an election as a de-stage primary host for a plurality of replica sets, and the method further comprises: based on receiving the election as the de-stage primary host for the plurality of replica sets, identifying a plurality of ring buffers stored in the computer system, each ring buffer corresponding to one of the plurality of replica sets and comprising a corresponding plurality of logs replicated from a corresponding primary ring buffer at a different host of the plurality of hosts, each log corresponding to a different cached write I/O request; and de-staging the corresponding plurality of logs from each of the plurality of ring buffers to the backing store.

Clause 15. The method of any of clauses 10 to 14, wherein the election as the de-stage primary host for the replica set is received after a failure of another host of the plurality of hosts to de-stage logs as a prior de-stage primary host.

Clause 16. The method of any of clauses 10 to 15, wherein the method further comprises: sending a notification to a management service after de-staging the plurality of logs from the ring buffer to the backing store.

Clause 17. The method of any of clauses 10 to 16, wherein the method further comprises: sending a notification to one or more of the plurality of hosts, after de-staging the plurality of logs from the ring buffer to the backing store.

Clause 18. A computer system, comprising: a processor system; and a computer storage medium that stores computer-executable instructions that are executable by the processor system to at least: receive a write I/O operation from a consumer; select a first replica set for caching the write I/O operation from a replica list; add a first log corresponding to the write I/O operation to a primary ring buffer of the first replica set; determine that the first log cannot be replicated to a secondary ring buffer of the first replica set; select a second replica set for caching the write I/O operation from the replica list; add a second log corresponding to the write I/O operation to a primary ring buffer of the second replica set; determine that the second log has been replicated to a secondary ring buffer of the second replica set; and based on determining that the second log has been replicated to the secondary ring buffer of the second replica set, acknowledge the write I/O operation to the consumer; and de-stage the second log to a backing store.

Clause 19. The computer system of clause 18, wherein, the consumer is a VM or a container executing in the computer system; and de-staging the second log to the backing store comprises de-staging the second log to a virtual disk corresponding to the VM or the container.

Clause 20. The computer system of any of clauses 18 or 19, wherein, the primary ring buffer of the first replica set is stored in a first persistent memory in the computer system; the primary ring buffer of the second replica set is stored in the first persistent memory in the computer system; the secondary ring buffer of the first replica set is stored in a second persistent memory in a first secondary computer system; and the secondary ring buffer of the second replica set is stored in a third persistent memory in a second secondary computer system.

Clause 21. A method implemented in a computer system that includes a processor system, comprising: determining that a condition has been met for transitioning write I/O requests for a consumer from a write-caching mode to a pass-through mode; de-staging one or more logs for the consumer from a write cache to a backing store, each log corresponding to a pending write I/O operation by the consumer; determining that no log for the consumer remains in the write cache for de-staging to the backing store; and initiating the pass-through mode after determining that no log for the consumer remains in the write cache for de-staging to the backing store, including routing a new write I/O request to the backing store rather than routing the new write I/O request to the write cache.

Clause 22. The method of clause 21, wherein, the consumer is a VM or a container executing in the computer system; and de-staging the one or more logs for the consumer to the backing store comprises de-staging the one or more logs to a virtual disk corresponding to the VM or the container.

Clause 23. The method of any of clauses 21 or 22, wherein the condition for transitioning write I/O requests for the consumer is met when, a user request has been identified, a migration of the consumer has been identified, an I/O error count for the consumer has reached a first threshold, or an I/O error rate for the consumer has reached a second threshold.

Clause 24. The method of any of clauses 21 to 23, wherein, the condition for transitioning write I/O requests for the consumer is met when the I/O error count for the consumer has reached the first threshold or the I/O error rate for the consumer has reached the second threshold; and the I/O error count for the consumer or the I/O error rate for the consumer is calculated over a sliding time window.

Clause 25. The method of any of clauses 21 to 24, wherein de-staging the one or more logs for the consumer from the write cache to the backing store comprises de-staging the one or more logs from a replica set that is associated with the consumer.

Clause 26. The method of any of clauses 21 to 25, wherein de-staging the one or more logs for the consumer from the write cache to the backing store comprises de-staging a log from each of a plurality of replica sets in a replica list that is associated with the consumer.

Clause 27. The method of any of clauses 21 to 26, wherein, the new write I/O request is a first new write I/O request; and the method further comprises: routing a second new write I/O request to the write cache after determining that the condition has been met, but prior to determining that no log for the consumer remains in the write cache for de-staging to the backing store.

Clause 28. The method of clause 27, wherein de-staging the one or more logs for the consumer from the write cache to the backing store comprises introducing latency into the second new write I/O request.

Clause 29. The method of clause 28, wherein a magnitude of the latency is based on a rate of de-staging the one or more logs for the consumer from the write cache to the backing store.

Clause 30. The method of clause 28, wherein a magnitude of the latency is based on a rate of write I/O requests received after identifying the condition for transitioning write I/O requests for the consumer.

Clause 31. The method of any of clauses 21 to 30, wherein, the new write I/O request is a first new write I/O request; and the method further comprises: determining that write I/O requests for the consumer are to be transitioned from the pass-through mode to the write-caching mode after initiating the pass-through mode; and initiating the write-caching mode, including routing a second new write I/O request to the write cache.

Clause 32. A computer system, comprising: a processor system; and a computer storage medium that stores computer-executable instructions that are executable by the processor system to at least: determine that a condition has been met for transitioning write I/O requests for a consumer from a write-caching mode to a pass-through mode; de-stage one or more logs for the consumer from a write cache to a backing store, each log corresponding to a pending write I/O operation by the consumer; route a first new write I/O request to the write cache after determining that the condition has been met; determine that no log for the consumer remains in the write cache for de-staging to the backing store; and initiate the pass-through mode after determining that no log for the consumer remains in the write cache for de-staging to the backing store, including routing a second new write I/O request to the backing store rather than routing the second new write I/O request to the write cache.

Clause 33. The computer system of clause 32, wherein, the consumer is a VM or a container executing in the computer system; and de-staging the one or more logs for the consumer to the backing store comprises de-staging the one or more logs to a virtual disk corresponding to the VM or the container.

Clause 34. The computer system of any of clauses 33 or 33, wherein the condition for transitioning write I/O requests for the consumer is met when, a user request has been identified, a migration of the consumer has been identified, an I/O error count for the consumer has reached a first threshold, or an I/O error rate for the consumer has reached a second threshold.

Clause 35. The computer system of any of clauses 32 to 34, wherein de-staging the one or more logs for the consumer from the write cache to the backing store comprises de-staging the one or more logs from a replica set that is associated with the consumer.

Clause 36. The computer system of any of clauses 32 to 35, wherein de-staging the one or more logs for the consumer from the write cache to the backing store comprises de-staging a log from each of a plurality of replica sets in a replica list that is associated with the consumer.

Clause 37. The computer system of any of clauses 32 to 36, wherein de-staging the one or more logs for the consumer from the write cache to the backing store comprises introducing latency into the first new write I/O request.

Clause 38. The computer system of clause 37, wherein a magnitude of the latency is based on a rate of de-staging the one or more logs for the consumer from the write cache to the backing store.

Clause 39. The computer system of clause 37, wherein a magnitude of the latency is based on a rate of write I/O requests received after identifying the condition for transitioning write I/O requests for the consumer.

Clause 40. A computer storage medium that stores computer-executable instructions that are executable by a processor system to at least: determine that a condition has been met for transitioning write I/O requests for a consumer from a write-caching mode to a pass-through mode; de-stage one or more logs for the consumer from a write cache to a backing store, each log corresponding to a pending write I/O operation by the consumer; route a first new write I/O request to the write cache after determining that the condition has been met, including introducing latency into the first new write I/O request based on, a first rate of de-staging the one or more logs for the consumer from the write cache to the backing store, or a second rate of write I/O requests received after identifying the condition for transitioning write I/O requests for the consumer; determine that no log for the consumer remains in the write cache for de-staging to the backing store; and initiate the pass-through mode after determining that no log for the consumer remains in the write cache for de-staging to the backing store, including routing a second new write I/O request to the backing store rather than routing the second new write I/O request to the write cache.

Embodiments of the disclosure comprise or utilize a special-purpose or general-purpose computer system (e.g., host 101*a*, 101*b*; host 301*a*-301*n*) that includes computer hardware, such as, for example, a processor system and system memory (e.g., RAM 111*a*, 111*b*; PMem 303*a*-303*n*), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media. Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more CPUs, one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more VMs. During operation, VMs emulate an operational computing system, supporting an OS and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system, comprising:
    determining that a condition has been met for transitioning write input/output (I/O) requests for a consumer from a write-caching mode to a pass-through mode;
    de-staging one or more logs for the consumer from a write cache to a backing store, each log corresponding to a pending write I/O operation by the consumer;
    determining that no log for the consumer remains in the write cache for de-staging to the backing store; and
    initiating the pass-through mode after determining that no log for the consumer remains in the write cache for de-staging to the backing store, including routing a new write I/O request to the backing store rather than routing the new write I/O request to the write cache.

2. The method of claim 1, wherein,
    the consumer is a virtual machine (VM) or a container executing in the computer system; and
    de-staging the one or more logs for the consumer to the backing store comprises de-staging the one or more logs to a virtual disk corresponding to the VM or the container.

3. The method of claim 1, wherein the condition for transitioning write I/O requests for the consumer is met when,
    a user request has been identified,
    a migration of the consumer has been identified,
    an I/O error count for the consumer has reached a first threshold, or
    an I/O error rate for the consumer has reached a second threshold.

4. The method of claim 3, wherein,
    the condition for transitioning write I/O requests for the consumer is met when the I/O error count for the consumer has reached the first threshold or the I/O error rate for the consumer has reached the second threshold; and
    the I/O error count for the consumer or the I/O error rate for the consumer is calculated over a sliding time window.

5. The method of claim 1, wherein de-staging the one or more logs for the consumer from the write cache to the backing store comprises de-staging the one or more logs from a replica set that is associated with the consumer.

6. The method of claim 1, wherein de-staging the one or more logs for the consumer from the write cache to the backing store comprises de-staging a log from each of a plurality of replica sets in a replica list that is associated with the consumer.

7. The method of claim 1, wherein,
    the new write I/O request is a first new write I/O request; and
    the method further comprises:
        routing a second new write I/O request to the write cache after determining that the condition has been met, but prior to determining that no log for the consumer remains in the write cache for de-staging to the backing store.

8. The method of claim 7, wherein de-staging the one or more logs for the consumer from the write cache to the backing store comprises introducing latency into the second new write I/O request.

9. The method of claim 8, wherein a magnitude of the latency is based on a rate of de-staging the one or more logs for the consumer from the write cache to the backing store.

10. The method of claim 8, wherein a magnitude of the latency is based on a rate of write I/O requests received after identifying the condition for transitioning write I/O requests for the consumer.

11. The method of claim 1, wherein,
    the new write I/O request is a first new write I/O request; and
    the method further comprises:
        determining that write I/O requests for the consumer are to be transitioned from the pass-through mode to the write-caching mode after initiating the pass-through mode; and
        initiating the write-caching mode, including routing a second new write I/O request to the write cache.

12. A computer system, comprising:
    a processor system; and
    a computer storage medium that stores computer-executable instructions that are executable by the processor system to at least:
        determine that a condition has been met for transitioning write input/output (I/O) requests for a consumer from a write-caching mode to a pass-through mode;
        de-stage one or more logs for the consumer from a write cache to a backing store, each log corresponding to a pending write I/O operation by the consumer;
        route a first new write I/O request to the write cache after determining that the condition has been met;
        determine that no log for the consumer remains in the write cache for de-staging to the backing store; and
        initiate the pass-through mode after determining that no log for the consumer remains in the write cache for de-staging to the backing store, including routing a second new write I/O request to the backing store rather than routing the second new write I/O request to the write cache.

13. The computer system of claim 12, wherein,
    the consumer is a virtual machine (VM) or a container executing in the computer system; and de-staging the one or more logs for the consumer to the backing store comprises de-staging the one or more logs to a virtual disk corresponding to the VM or the container.

14. The computer system of claim 12, wherein the condition for transitioning write I/O requests for the consumer is met when,
a user request has been identified,
a migration of the consumer has been identified,
an I/O error count for the consumer has reached a first threshold, or
an I/O error rate for the consumer has reached a second threshold.

15. The computer system of claim 12, wherein de-staging the one or more logs for the consumer from the write cache to the backing store comprises de-staging the one or more logs from a replica set that is associated with the consumer.

16. The computer system of claim 12, wherein de-staging the one or more logs for the consumer from the write cache to the backing store comprises de-staging a log from each of a plurality of replica sets in a replica list that is associated with the consumer.

17. The computer system of claim 12, wherein de-staging the one or more logs for the consumer from the write cache to the backing store comprises introducing latency into the first new write I/O request.

18. The computer system of claim 17, wherein a magnitude of the latency is based on a rate of de-staging the one or more logs for the consumer from the write cache to the backing store.

19. The computer system of claim 17, wherein a magnitude of the latency is based on a rate of write I/O requests received after identifying the condition for transitioning write I/O requests for the consumer.

20. A computer storage medium that stores computer-executable instructions that are executable by a processor system to at least:
determine that a condition has been met for transitioning write input/output (I/O) requests for a consumer from a write-caching mode to a pass-through mode;
de-stage one or more logs for the consumer from a write cache to a backing store, each log corresponding to a pending write I/O operation by the consumer;
route a first new write I/O request to the write cache after determining that the condition has been met, including introducing latency into the first new write I/O request based on,
a first rate of de-staging the one or more logs for the consumer from the write cache to the backing store, or
a second rate of write I/O requests received after identifying the condition for transitioning write I/O requests for the consumer;
determine that no log for the consumer remains in the write cache for de-staging to the backing store; and
initiate the pass-through mode after determining that no log for the consumer remains in the write cache for de-staging to the backing store, including routing a second new write I/O request to the backing store rather than routing the second new write I/O request to the write cache.

* * * * *